US006892387B1

(12) United States Patent
Lee

(10) Patent No.: US 6,892,387 B1
(45) Date of Patent: May 10, 2005

(54) SYSTEM AND METHOD FOR COMPENSATING VIEWER FOR VIEWING OF DESIGNATED CHANNEL WITH REDUCTION OF TELEPHONE CHARGES

(76) Inventor: Kum-sok Lee, 1044-4, Bisan-3dong, Dongan-ku, Anyang city, Kyungki-do (KR)

(*) Notice: Subject to any disclaimer, the term of this patent is extended or adjusted under 35 U.S.C. 154(b) by 797 days.

(21) Appl. No.: 09/651,088

(22) Filed: Aug. 30, 2000

(30) Foreign Application Priority Data

Jan. 27, 2000 (KR) .......................................... 2000-3905
Aug. 8, 2000 (KR) ....................................... 2000-45875

(51) Int. Cl.[7] .......................... H04N 7/16; H04N 7/173; H04N 9/00; H04M 15/00
(52) U.S. Cl. ................................ 725/23; 725/5; 725/8; 725/22; 725/106; 725/110; 725/122; 725/133; 725/141; 725/153; 379/114.01; 379/114.02; 379/114.1; 379/114.13
(58) Field of Search ............................... 725/1, 5, 8, 13, 725/22, 23, 110, 122, 133, 141, 153, 34, 106; 705/14, 402; 348/14.01, 14.06; 379/114.01, 114.02, 114.1, 114.13, 121.02

(56) References Cited

U.S. PATENT DOCUMENTS

| 4,349,701 A | | 9/1982 | Snopko | |
|---|---|---|---|---|
| 5,027,426 A | | 6/1991 | Chiocca, Jr. | |
| 5,357,276 A | * | 10/1994 | Banker et al. ............... | 725/102 |
| 5,448,625 A | * | 9/1995 | Lederman ............... | 379/114.13 |
| 5,636,346 A | * | 6/1997 | Saxe ........................... | 725/35 |
| 5,960,416 A | * | 9/1999 | Block ........................... | 705/34 |
| 6,084,628 A | * | 7/2000 | Sawyer ........................ | 725/34 |
| 6,141,006 A | * | 10/2000 | Knowlton et al. ............. | 705/26 |
| 6,477,509 B1 | * | 11/2002 | Hammons et al. ............ | 705/14 |
| 6,510,152 B1 | * | 1/2003 | Gerszberg et al. .......... | 725/110 |
| 6,567,854 B1 | * | 5/2003 | Olshansky et al. ........... | 705/14 |

FOREIGN PATENT DOCUMENTS

JP         9114755 A       5/1997

OTHER PUBLICATIONS

IBM Technical Disclosure Bulletin vol. 38 No. 8 Aug. 1995, pp. 285–287.*

* cited by examiner

Primary Examiner—John Miller
Assistant Examiner—Michael W. Hoye
(74) Attorney, Agent, or Firm—Stites & Harbison PLLC; Ross F. Hunt, Jr.

(57) ABSTRACT

Disclosed is a system for compensating a viewer for viewing of a designated channel with reduction of telephone charges. The system comprises a signal input port to which image signals from a plurality of channels are accessed; a signal output port for supplying the image signals to a picture receiving device for displaying them; a telephone network port to which an external telephone network is accessed; a telephone connection port accessed to a telephone set; a channel filtering unit connected between the signal input port and the signal output port, for outputting only the image signals from a single channel among the plurality of channels to the signal output port; and a controller for controlling the channel filtering unit so that the designated channel is output when making a phone call. With this configuration, an audience rating of the designated channel can increase and the telephone charges of the user can be reduced.

10 Claims, 3 Drawing Sheets

SYSTEM AND METHOD FOR COMPENSATING VIEWER FOR VIEWING OF DESIGNATED CHANNEL WITH REDUCTION OF TELEPHONE CHARGES

BAKCGROUND OF THE INVENTION

1. Technical Field of the Invention

The present invention relates in general to a system and a method for compensating users for viewing of a designated channel with reduction of telephone charges.

2. Description of the Related Art

Conventionally, broadcasting is classified into radio broadcasting and cable broadcasting according to absence and presence of transmission cables. The radio broadcasting covers satellite broadcasting using a satellite and terrestrial broadcasting using no satellite.

Modes of transmitting broadcasting signals include an analog mode in which data is converted into analog signals for transmission and a digital mode in which data is converted into digital signals for transmission. The digital mode is more advantageous than the analog mode, in that it enables a plurality of programs to be broadcast in a single channel, presents pictures of good quality and is resistant to noise. In addition, according to the digital mode, limited reception of broadcasting is possible, thereby allowing only a designated viewer to watch a designated channel.

Cable broadcasting, terrestrial broadcasting and satellite broadcasting have provided a variety of channels and/or programs for education, entertainment, politics, economy, culture, movie, etc. Terrestrial broadcasting stations have usually resorted to advertising fees by commercial broadcasts to gain almost all of their income whereas cable or satellite broadcasting stations have usually been dependent upon subscription fees to obtain most of their income. In the case of terrestrial broadcasting, orders for advertisements are converged into the time slots of high-rated channels or programs. In the case of cable or satellite broadcastings, the number of subscribers increases as a channel or a program obtains a high rating. In addition, in those channels for home shopping, the income is mostly dependent upon the amount of sales, and the sales amount is generally proportional to the audience rating. Thus, the audience rating for channels or programs of each broadcasting directly influences upon the income thereof, which is crucial in the continued existence of each broadcasting station.

If digital broadcasting using the digital mode is prevailing in the near future, much more channels will be provided than broadcasting channels through current cable, terrestrial and satellite broadcastings. According to the digital broadcasting, since limited reception of each channel is allowed, terrestrial or satellite broadcasting stations as well as cable broadcasting stations will be able to charge the viewers for some or all of the channels. Consequently, to enhance the audience rating, there will be an excessive competition between the operators of the cable, terrestrial and satellite broadcasting stations, and in response, each operator has needs to improve quality of the broadcasting and also to have a separate strategy, to heighten the audience rating.

SUMMARY OF THE INVENTION

Accordingly, the present invention has been made keeping in mind the above-described needs, and an object of the present invention is to provide a system and a method for compensating a user for viewing of a designated channel with reduction of telephone charges, thereby increasing an audience rating of a designated channel and reducing the viewer's telephone charges.

This and other objects of the present invention may be achieved by the provision of a system for compensating a viewer for viewing of a designated channel with reduction of telephone charges, comprising a signal input port to which image signals from a plurality of channels are accessed, a signal output port for supplying the image signals to a picture receiving device for displaying them, a telephone network port to which an external telephone network is accessed, a telephone connection port accessed to a telephone set, a channel filtering unit connected between the signal input port and the signal output port, for outputting only the image signals from a single channel among the plurality of channels to the signal output port, and a controller for controlling the channel filtering unit so that the designated channel is output when making a phone call.

The system further comprises a service selection unit for selecting a free or discounted call service, wherein, when a call service is selected from the service selection unit, the controller controls the channel filtering unit so as to change the channel to the designated channel, thereby causing a telephone user to view the designated channel during calling.

The system further comprises a call start detector connected between the controller and the telephone connection port, for detecting whether a phone call is initiated, and an ID number generator connected between the telephone network port and the telephone connection port, for automatically dialing the identification number registered by the operator of the designated channel, when a phone call starts.

The controller sends a signal to the ID number generator to generate a signal tone corresponding to the ID number of the operator and transmits it to a telephone station, when the call start detector detects that the phone call is initiated after a call service is selected from the service selection unit.

The system further comprises a channel selection input unit allowing a viewer to externally select a channel, wherein, if a channel is changed to the designated channel according to the service selected from the service selection unit, the controller interrupts signaling from the channel selection input unit and prevents external selection of the channel, to thereby maintain the designated channel while making the call.

The system further comprises an output detector for detecting whether the image signals of the picture receiving device electrically are output, wherein, where the image signals of the picture receiving device is not output when the service is selected from the service selection unit, the controller controls the picture receiving device to turn on.

The controller displays a message requesting a response thereto at the start of the phone call and controls the status of the call depending upon the response, thereby causing the user to view the designated channel.

The image signal input into the signal input port is formed of at least one of cable, terrestrial and satellite broadcastings which are transmitted in either mode of analog or digital.

According to another aspect of the present invention, this and other objects may be achieved by a method for compensating a viewer for viewing of a designated channel with reduction of telephone charges, comprising the steps of detecting whether a phone call has initiated or not, and causing a channel of a picture receiving device displaying image signals to be output to the designated channel while making the phone call.

The method further comprises the steps of selecting a discounted or free call service, and automatically generating a signal tone corresponding to the identification number of the operator of the designated channel and providing it with a telephone station, when the phone call starts.

The method further comprises the steps of detecting whether the image signals of the picture receiving device is output when a free or discounted call service is selected, and causing the picture receiving device to turn on if it is detected that the image signals of the picture receiving device is not output.

The method further comprises the step of interrupting an external selection of other channels when the channel is changed to the designated channel.

The method further comprises the steps of displaying a message requesting a response thereto when a call is initiated, and controlling the status of the phone call depending upon the response.

The image signals input into the signal input port are formed of at least one of cable, terrestrial and satellite broadcastings which are transmitted in either mode of analog or digital.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF PREFERRED EBMODIMENTS

Hereinbelow, the present invention will be described in more detail with reference to the accompanying drawings.

Generally, an integrated receiver decoder (IRD) called a set-top box is separately installed in order to receive image signals in the case of cable or satellite broadcastings. The set-top box for the cable broadcasting has functions of selecting a channel from the image signals and also counting the time during which charged channels are viewed, to bill the viewing charges. In the meantime, if the digital broadcasting starts to be supplied on a regular basis, a TV set in the analog mode having no digital receiving device will need to have a separate set-top box in order to receive the digital broadcasting.

The present invention adds a separate function to an existing set-top box for cable broadcasting, terrestrial broadcasting or satellite broadcasting transmitted in the analog mode or the digital mode, to thereby allow a viewer or a subscriber of each broadcasting to use a free or discounted call service in consideration of viewing the designated channel. The separate function and configuration therefor will be fully understood by the accompanying detailed description of the present invention.

Figure 1:
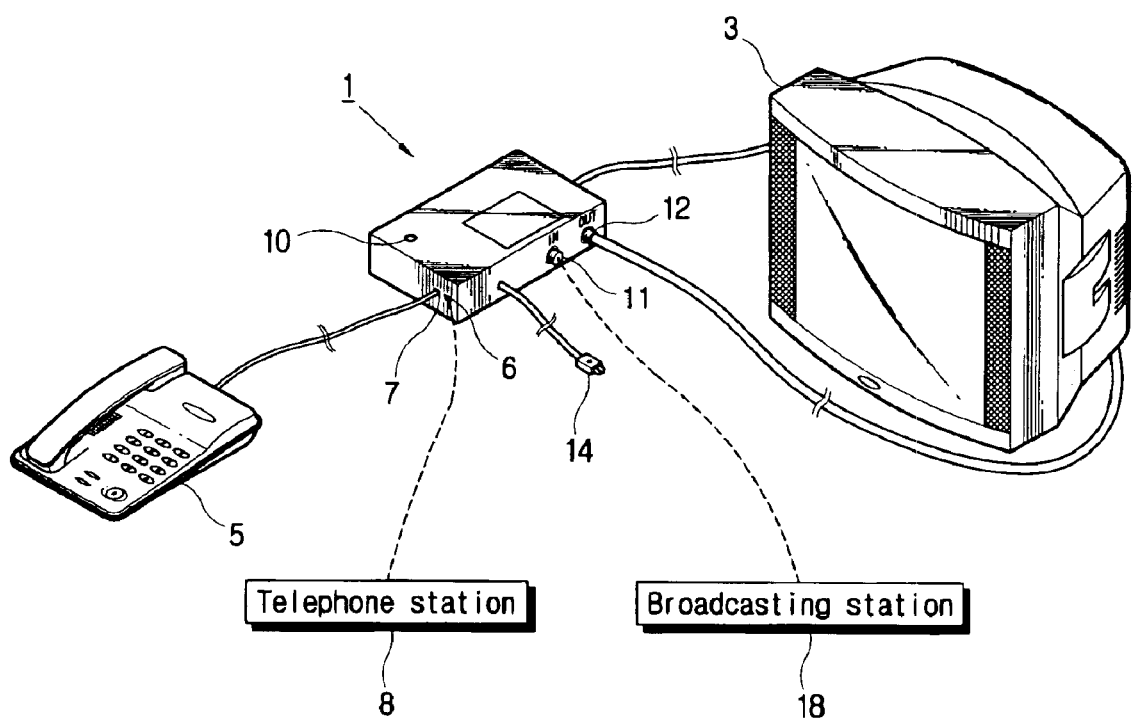
FIG. 1 is a schematic view of a system according to the present invention.
Figure 2:
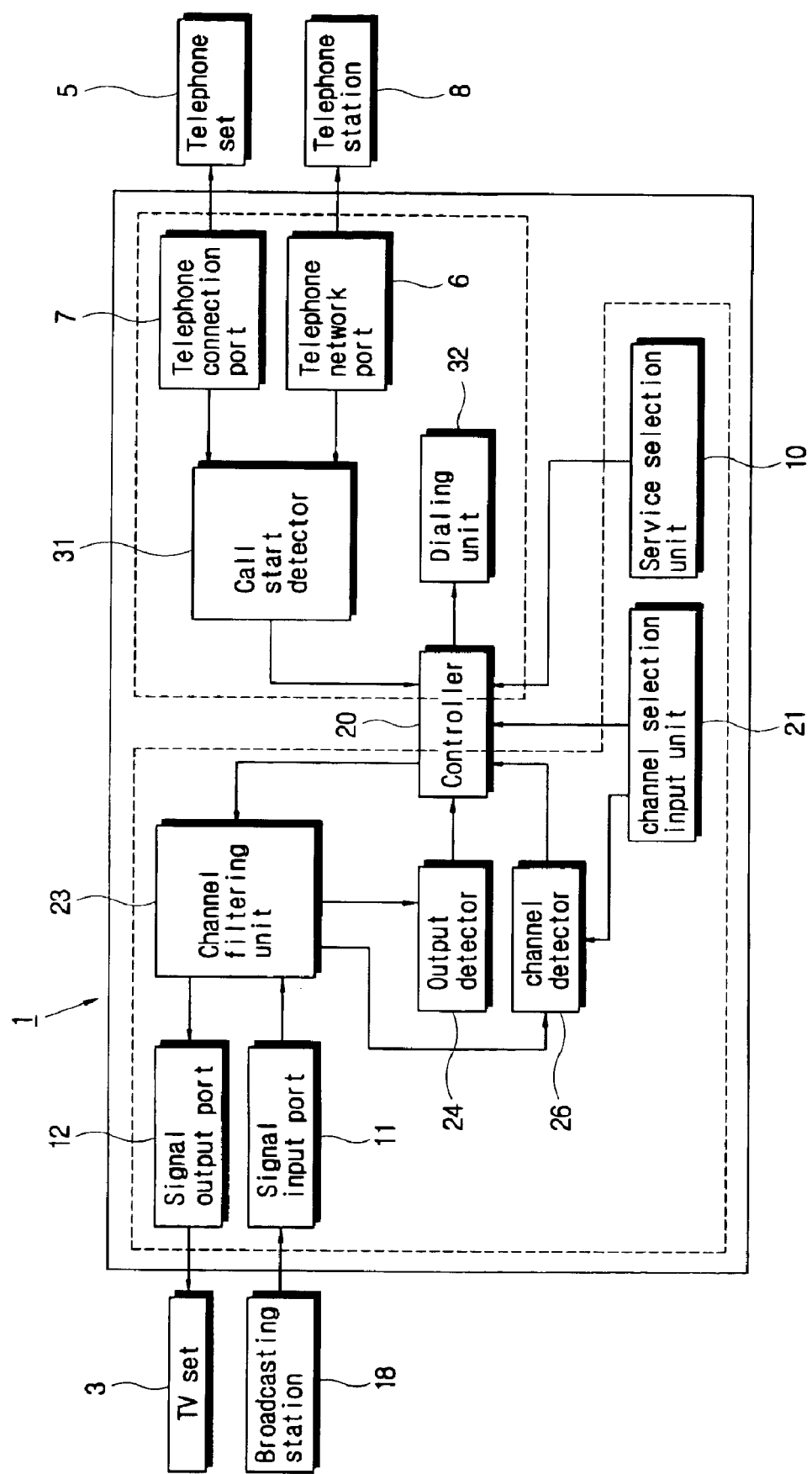
FIG. 2 is a block diagram showing a detailed configuration of a multipurpose set-top box of FIG. 1.

Referring to FIGS. 1 and 2, a multipurpose set-top box 1 is electrically connected to a TV set 3 for displaying pictures and a telephone set 5. For this connection, a plurality of ports are provided in the set-top box 1.

In one side of the multipurpose set-top box 1 are installed a signal input port 11 and a signal output port 12 for receiving signals from the outside, e.g., a broadcasting station 18 and supplying the signals to a TV set 3, and a plug 14 of the set-top box 1 for supplying an electricity to the set-top box 1. In another side of the set-top box 1 are installed a telephone network port 6 and a telephone connection port 7 for transmitting communication signals between a telephone station 8 and the telephone set 5. In still another side of the set-top box 1 is installed a socket (not shown) to which a plug (not shown) of the TV set 3 is connected.

Image signals input into the signal input port 11 include characters and voices as well as pictures. The image signals cover image signals transmitted from the cable broadcasting, the satellite broadcasting or the terrestrial broadcasting, and communication signals supplied from communication service operators to offer value-added communication services. Accordingly, the signal input port 11 is connected to a cable from the cable broadcasting, a line from an antenna for receiving the satellite broadcasting or a line from an antenna for receiving the terrestrial broadcasting, or an exclusive line, a power line or a telephone line for receiving value-added communication services from the communication service operators. The TV set 3 is connected to the signal output port 12, and the image signals selected from the multipurpose set-top box 1 are supplied to the TV set 3 through the signal output port 12.

The telephone line from the telephone station 8 is connected to the telephone network port 6 and the telephone set 5 is connected to the telephone connection port 7. Communication signals between the telephone set 5 and the telephone station 8 are input and/or output by the telephone network port 6 and the telephone connection port 7, and signal tones resulting from dialing the telephone set 5 are output to the telephone station 8.

The multipurpose set-top box 1 is equipped with a channel controlling device 25 for causing the designated signal to broadcast through the TV set 3 where a viewer selects either of a free or discounted call service, and a call controlling device 30 for causing a signal tone corresponding to an identification number of each operator to be automatically generated and output to the telephone station 8, when a viewer selects a call service for making a phone call. At this time, the channel is fixed to a specified frequency from which pictures and characters, etc. are generated.

An operator of the system provides a viewer with free or discounted call services when he or she views the channel designated through the multipurpose set-top box 1. For this purpose, the operator contracts agreements in advance with operators of cable, satellite or terrestrial broadcastings, under which a designated channel is broadcast when a viewer selects either of the call services. Additionally, the operator installs a telephone charge controller (not shown) for separately managing charges for phone calls connected through the multipurpose set-top box 1, in consultation with the telephone station 8, and the operator receives from the telephone station 8 a separate identification number for accessing to the telephone charge controller.

The channel controlling device 25 includes a call service selection unit 10 for selecting a free or discounted call service, a channel filtering unit 23 for changing a channel to a designated channel when a call service is selected from the call service selection unit 10, and an output detector 24 for detecting whether an image signal is output to the TV set 3 when selecting the call service. The channel controlling device 25 further includes a channel selection input unit 21 for allowing a viewer to externally select a channel, and a channel detector 26 for detecting the selected channel signal input from the channel selection input unit 21 and for detecting whether the channel is changed through the channel filtering unit 23. The service selection unit 10 is provided with buttons for selecting services, installed on the outer surface of the multipurpose set-top box 1, for allowing a user to select a call service.

The call controlling device 30 has a call start detector 31 for detecting whether a call is initiated, depending upon whether the hook of the telephone set 5 is on or off, and a signal tone generator 32 for automatically generating a signal tone corresponding an identification number of an operator of the system.

The controller 20 controlling the channel controlling device 25 and the call controlling device 30, causes a channel of the TV set 3 to be changed to the designated channel by transmitting a channel selection signal to the channel filtering unit 23 if a viewer selects a call service from the service selection unit 10. Once the channel is changed to the designated signal, the controller 20 interrupts the channel selection signal input into the channel filtering unit 23 from the channel selection input unit 21, to thereby prevent the viewer from changing the designated channel to other channels. The controller 20 also determines whether the TV set 3 turns on or off, for outputting the image signals detected from the output detector 24 when selecting the call service.

The controller 20 causes a signal tone corresponding to an identification number of an operator to be automatically generated from the signal tone generator 32 when it detects the start of a phone call by hook-on of the telephone set 5 and a call service is selected from the call service selection unit 10. If the signal tone is transmitted to the telephone station 8, the telephone station 8 identifies the operator according to the ID number and manages the telephone charges through the telephone charge controller. The telephone station 8 later bills the operator for some or all of the phone calls made by the viewer.

During the call service under the system, if the user does not view the TV set 3, the broadcasting operator cannot attain little effect on advertisement and marketing whereas the operator has to pay the user's telephone charges. In order to avoid such undue payment, the controller 20 has a function of checking whether the user is viewing the designated channel, at a predetermined interval of time while the call service is providing. For this purpose, the controller 20 displays a message requesting a response thereto at the beginning of a call; for example, it may request the user to press the channel selection input unit 21 or any button on the telephone set. Depending upon the response from the user, the controller 20 can control the status of the call.

Figure 3:
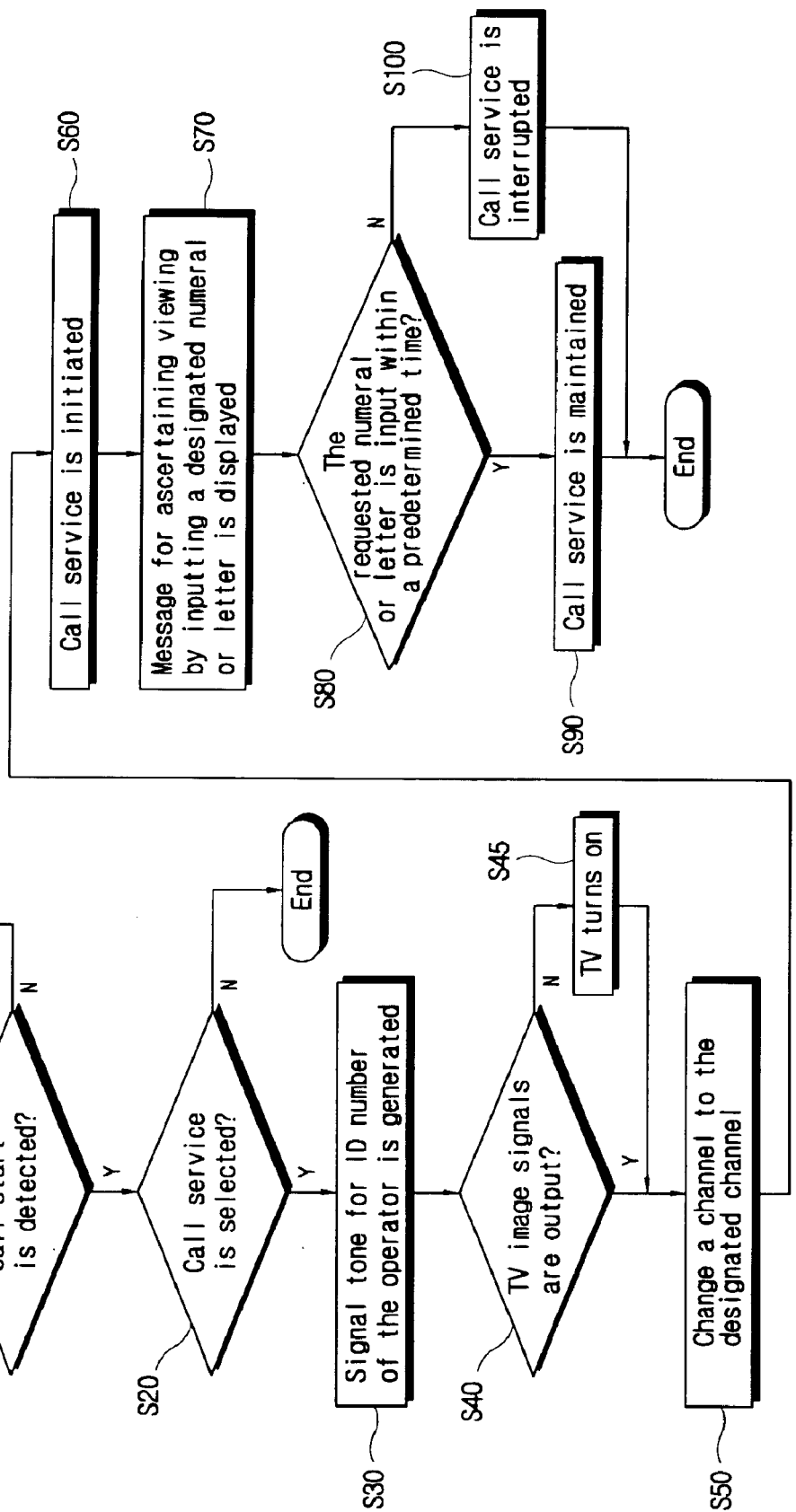
FIG. 3 is a flow chart for selecting a call service according to the present invention.

As illustrated in FIG. 3, if a viewer picks up a receiver, the call start detector 31 detects a call start according to the hook pressed or released by the receiver (S10). If a call starts and a call service starts from the service selection unit 10 (S20), the controller transmits a call start signal to the ID number generator 32, to thereby cause a signal tone corresponding to the identification number of the concerned operator to be generated and transmit the generated signal to the telephone station (S30).

At the same time, the controller 20 detects whether the image signals are output through the TV set 3 (S40). Where it is detected that the image signals are output, the controller 20 sends the channel filtering unit 23 a signal to change a channel to the designated channel (S50). Where it is detected that the image signals are not output, the controller 20 causes the TV set 3 to turn on, and then changes the channel to the designated channel (S45 & S50). The controller 20 interrupts a signal input from the channel selection input unit 21, thereby preventing the channel from being changed by the viewer's selection of other channel.

If the viewer dials the recipient's phone number after the channel is changed, the telephone station 8 recognizes the identification number to manage the phone charges through the phone charge controller, and connects the sender's telephone to the recipient's phone line according to the former's dialing so that a call service is initiated (S60).

The channel detector 26 steadily detects a channel of the TV set 3 and the controller 20 determines whether the change of channel through the channel filtering unit 23 is properly made based on the result of detection from the channel detector 26 if the call service is selected. If the channel is not properly changed, the controller 20 re-sends the channel filtering unit 23 a signal to change the channel to the designated channel.

In order to determine whether the user is viewing the designated channel during the call service, the controller 20 displays a message for indicating the viewing through the screen of the TV set 3, which requests the viewer to input a designated numeral or letter into the channel selection input part 21. If the designated numeral or letter as requested is input, the controller 20 maintains the call service (S80 & S90). However, if they are not input after a predetermined period of time elapses or they are different from those requested by the controller 20, the controller 20 determines that the viewer is not viewing the designated channel and interrupts the call service by interrupting an electric source between the telephone network port 6 and the telephone connection port 7.

According to the present invention, there is provided a multipurpose set-top box 1 having a combination of the channel controlling device 25 and the call controlling device 30, allowing a user to make a phone call free or at a discounted rate, in consideration of viewing the designated channel. Since a designated channel in cable, satellite or terrestrial broadcastings increases in an audience rating, the terrestrial broadcasting station can secure the clients for advertising and the cable or satellite broadcasting station can secure the subscription fee. Also, in the channels for home shopping, they secure potential customers who may purchase the articles advertised therein. Accordingly, the operator of each broadcasting can increase the profit.

In the above-described embodiments, the viewer is able to select a call service from the service selection unit 10. If the viewer makes a phone call, with removal of the service selection unit 10 from the multipurpose set-top box 1, the channel of the TV set 3 is automatically changed to the designated channel. Likewise, the signal tone for the ID number can be set to be automatically generated.

In the above-described embodiments, the picture receiving device is referred to as the TV set 3. However, the user can view cable and satellite broadcastings as well as a terrestrial broadcasting from a usual personal computer, if a separate reception card is attached thereto. Thus, the picture receiving device under the present invention is not limited to the TV set 3. The present invention can be embodied with an usual personal computer or other picture receivable devices.

As described above, according to the present invention, an audience rating of the designated channel can increase and the telephone charges of the user can be reduced.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A system for compensating a viewer for viewing of a designated channel with reduction of telephone charges, comprising:

a signal input port for receiving image signals through a plurality of channels;

a signal output port for outputting the image signals to a displaying device;

a telephone network port to which a telephone network is accessed;

a telephone connection port accessed to a telephone set;

a channel filtering unit connected between the signal input port and the signal output port, the channel filtering unit for outputting the image signals from a selected single channel among the plurality of channels to the signal output port;

a controller for controlling the channel filtering unit so that the image signals of a predetermined channel is output when using said telephone set; and a service selection unit for selecting free or discounted call services;

wherein when a free or discounted call service is selected through the service selection unit, the controller controls the channel filtering unit so as to change the active channel to the designated channel, thereby causing a telephone user to view the predetermined channel during calling; and wherein the system further comprises:

a call start detector connected between the controller and the telephone connection port, for detecting whether a phone call is initiated; and an ID number generator connected between the telephone network port and the telephone connection port, for automatically dialing an identification number registered by the operator of the designated channel, when a phone call starts.

2. The system according to claim 1, wherein the controller sends the ID number generator a signal to generate a signal tone corresponding to the ID number of the operator and transmits it to a telephone station, when the call start detector detects that the phone call is initiated after a call service is selected from the service selection unit.

3. The system according to claim 2, further comprising a channel selection input unit allowing a viewer to externally select a channel, Wherein, if a channel is changed to the designated channel according to the service selected from the service selection unit, the controller interrupts signaling from the channel selection input unit and prevents external selection of the channel, to thereby maintain the designated channel while making the call.

4. The system according to claim 3, further comprising an output detector for detecting whether the image signals of the picture receiving device electrically are output, wherein where the image signals of the picture receiving device is not output when the service is selected from the service selection unit, the controller controls the picture receiving device to turn on.

5. The system according to claim 4, wherein the controller displays a message requesting a response thereto at the start of the phone call and controls the status of the call depending upon the response, thereby causing the user to view the designated channel.

6. The system according to any one of claim 1, wherein the image signal input into the signal input port are comprised of at least one of cable, terrestrial and satellite broadcastings which are transmitted in either mode of analog or digital.

7. A method for compensating a viewer for viewing of a designated channel with reduction of telephone charges, comprising the steps of:

detecting whether a phone call has initiated or not;

causing a channel of a picture receiving device displaying image signals to be output to the designated channel while making the phone call;

selecting a discounted or free call service; and automatically generating a signal tone corresponding to an identification number of the operator of the designated channel and providing it with a telephone station, when the phone call starts;

said method further comprising the steps of:

detecting whether the image signals of the picture receiving device is output when a free or discounted call service is selected; and causing the picture receiving device to turn on if it is detected that the image signals of the picture receiving device are not output.

8. The method according to claim 7, further comprising the step of interrupting an external selection of other channels when the channel is changed to the designated channel.

9. The method according to claim 8, further comprising the steps of:

displaying a message requesting a response thereto when the phone call is initiated; and controlling the status of the call depending upon the response.

10. The method according to claim 7, wherein the image signals input into the signal input port are comprised of at least one of cable, terrestrial and satellite broadcastings which are transmitted in either mode of analog or digital.

* * * * *